US009794253B2

(12) United States Patent
Narayan et al.

(10) Patent No.: US 9,794,253 B2
(45) Date of Patent: Oct. 17, 2017

(54) DEVICE SECURITY UTILIZING CONTINUALLY CHANGING QR CODES

(71) Applicant: GOOGLE TECHNOLOGY HOLDINGS LLC, Mountain View, CA (US)

(72) Inventors: Shyam Narayan, Grayslake, IL (US); Naveen Aerrabotu, Gurnee, IL (US); Rohit R. Sinha, Grayslake, IL (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/712,034

(22) Filed: May 14, 2015

(65) Prior Publication Data

US 2015/0244715 A1   Aug. 27, 2015

Related U.S. Application Data

(63) Continuation of application No. 13/802,854, filed on Mar. 14, 2013, now abandoned.

(51) Int. Cl.
*G06F 21/00* (2013.01)
*H04L 29/06* (2006.01)
(Continued)

(52) U.S. Cl.
CPC .......... *H04L 63/0846* (2013.01); *G06F 21/31* (2013.01); *G06F 21/44* (2013.01);
(Continued)

(58) Field of Classification Search
None
See application file for complete search history.

(56) References Cited

U.S. PATENT DOCUMENTS

| 8,321,917 B2 | 11/2012 | Kikkawa et al. |
| 2002/0026366 A1 | 2/2002 | Ohtsuki et al. |

(Continued)

OTHER PUBLICATIONS

TRAQR, Trackable Dynamic QR Codes, Trackable Dynamic QR Codes—TrakQR, Dec. 26, 2012, http://rakqr.com/, all pages.

*Primary Examiner* — Hadi Armouche
*Assistant Examiner* — Andrew Steinle
(74) *Attorney, Agent, or Firm* — Morgan, Lewis & Bockius LLP (57) ABSTRACT

A method provides device access security via use of periodically changing Quick Response (QR) codes. The method includes: generating (706) a first authentication QR code and assigning (708) the generated QR code as the current authentication mechanism for accessing the device. Contemporaneously with the generation of the QR code, at least one QR code validity parameter is established (710) to define when access to the device can be provided to a second device that provides the correct authentication QR code along with the access request. The method includes, in response to a pre-defined trigger (712) of the QR code validity parameter: generating (704) a new authentication QR code, different from a previously generated authentication QR code; assigning (708) the new authentication QR code as the current authentication mechanism for accessing the device; and enabling access to the first device to only second devices that provide the current authentication QR code.

20 Claims, 8 Drawing Sheets

(51) Int. Cl.
  *G06F 21/44* (2013.01)
  *G06F 21/31* (2013.01)
  *H04L 9/32* (2006.01)
  *H04W 12/04* (2009.01)
  *H04W 12/06* (2009.01)
  *H04W 84/18* (2009.01)

(52) U.S. Cl.
  CPC .......... *G06F 21/445* (2013.01); *H04L 9/3228* (2013.01); *H04W 12/04* (2013.01); *H04W 12/06* (2013.01); *H04L 63/068* (2013.01); *H04L 63/107* (2013.01); *H04L 63/108* (2013.01); *H04W 84/18* (2013.01)

(56) References Cited

U.S. PATENT DOCUMENTS

| | | |
|---|---|---|
| 2007/0201081 A1 | 8/2007 | Murayama |
| 2011/0055909 A1* | 3/2011 | Dowlatkhah ........... G06F 21/31 726/6 |
| 2012/0124656 A1* | 5/2012 | Senac ................... H04L 9/3213 726/9 |
| 2012/0287290 A1* | 11/2012 | Jain ......................... H04L 63/18 348/207.1 |
| 2012/0322384 A1 | 12/2012 | Zerr et al. |
| 2013/0124855 A1 | 5/2013 | Varadarajan et al. |
| 2013/0237155 A1 | 9/2013 | Kim |
| 2013/0278622 A1* | 10/2013 | Sun ......................... G06Q 20/22 345/589 |
| 2014/0026204 A1 | 1/2014 | Buntinx |
| 2014/0333509 A1* | 11/2014 | Yuann ................... G06F 3/1407 345/2.1 |

\* cited by examiner

DEVICE SECURITY UTILIZING CONTINUALLY CHANGING QR CODES

CROSS-REFERENCE TO RELATED APPLICATIONS

This application is a continuation of U.S. patent application Ser. No. 13/802,854, filed Mar. 14, 2013, entitled "Device Security Utilizing Continually Changing QR Codes," which is herein incorporated by reference.

BACKGROUND

1. Technical Field

The present disclosure generally relates to providing security for accessing personal electronic devices and in particular to use of quick response (QR) codes to provide security for accessing personal electronic devices.

2. Description of the Related Art

Personal electronic devices such as smart phones, tablets, and others are widely utilized to store data content that the user prefers not to be generally accessible to the public. Occasionally, the user of the device wishes to share certain data content stored on the device with a user of a second device via a direct transfer of that data content. Several of these devices can include a pairing mechanism by which the first device is able to communicatively connect to a second device and exchange data content via a created pairing or communication channel. The pairing of these devices can involve an exchange of a pairing credential that is pre-established for the first device and/or the second device to be able to share the data content between the devices.

The use of quick response (QR) codes has grown over the years as a mechanism for providing direct access via a QR image to a website or other information that is embedded within the QR image. With most personal devices now including a display and a QR code scanner, the exchange of QR codes from one device to another via direct QR image capture is possible.

BRIEF DESCRIPTION OF THE DRAWINGS

The disclosure will best be understood by reference to the following detailed description of illustrative embodiments when read in conjunction with the accompanying drawings, wherein.

DETAILED DESCRIPTION

The illustrative embodiments of the present disclosure provide a method and device that provides access security via use of periodically changing Quick Response (QR) codes. According to one aspect, the method includes: generating a first authentication QR code and assigning the first authentication QR code as a current authentication mechanism for accessing a first device. Contemporaneously with the generation of the QR code, at least one QR code validity parameter is established that defines when access to the first device can be provided to a second device that provides the first authentication QR code along with an access request. The method also includes, in response to a pre-defined trigger associated with the selected at least one QR code validity parameter: generating a new authentication QR code that is different from a previously generated authentication QR code; assigning the new authentication QR code as the current authentication mechanism for accessing the first device; associating a corresponding new QR code validity parameter to the new authentication QR code; and initiating a tracking of the corresponding new QR code validity parameter during which the new authentication QR code remains valid.

According to one or more embodiments, the at least one QR code validity parameter comprises at least one of (1) a time window having an end time and (2) a defined location within which an authentication QR code remains valid, and outside of which the authentication QR code is invalid. A new authentication QR code is automatically generated when the first device moves outside of the defined location and a new defined location is established for the new authentication QR code. Also, the pre-defined trigger is an associated one of the end time and movement of the first device outside of the defined location. The method also includes enabling access to the first device by at least one second device that communicates an access request to the first device, where the access request provides an authentication QR code that is the current authentication parameter for accessing the first device, while the selected at least one QR code validity parameter associated with the authentication QR code remains valid. In one implementation, enabling access includes enabling pairing of a second device with the first device in response to the second device providing the first authentication QR code as the authentication parameter during pairing of the second device to the first device.

Additionally, in response to the selected at least one QR code validity parameter being the defined location, the method then includes periodically triggering the generating of the new authentication QR code at the end of a second time window associated with the first device remaining in a same defined location for longer than the second time window.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Figure 1:
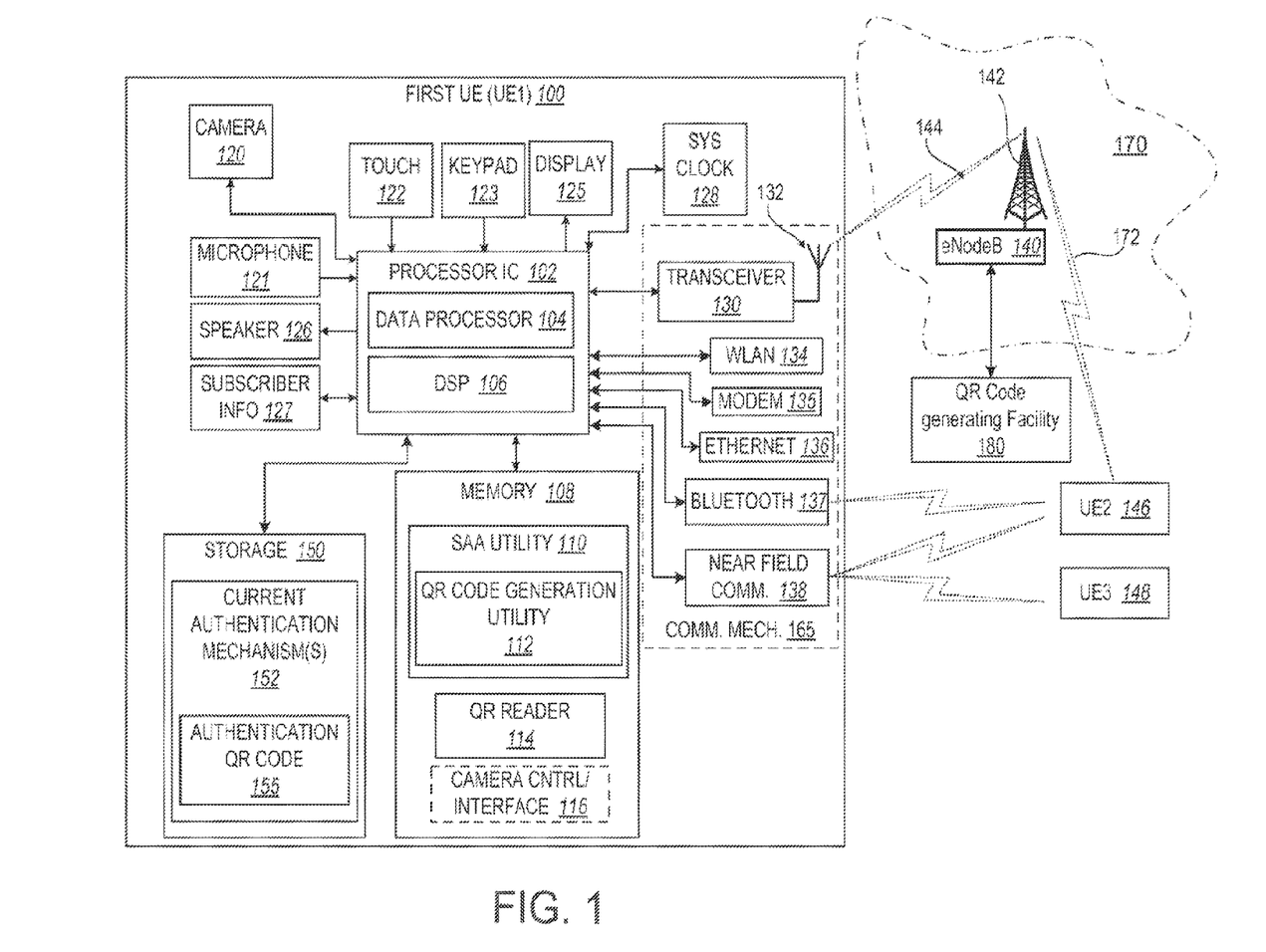
FIG. 1 provides a block diagram representation of an example user equipment configured with various functional components that enable one or more of the described features of the disclosure, according to one embodiment.

Turning now to FIG. 1, there is depicted a block diagram representation of an example user equipment (UE) within which several of the features of the disclosure can be implemented. According to the general illustration, first UE (UE1) 100 is a processing device that is designed to communicate with other devices via one of a wireless communication network, generally represented by base station 140 and antenna 142, and one or more near field communication (NFC) devices 138. UE1 100 can be one of a host of different types of devices, including but not limited to, a mobile cellular phone or smart-phone, a laptop, a net-book, an ultra-book, and/or a tablet computing device. These various devices all provide and/or include the necessary hardware and software to enable generation of an authentication QR image for use during pairing of UE1 100 with a second UE. Additionally, UE1 100 includes the hardware and software to support the various wireless or wired communication functions.

Referring now to the specific component makeup and the associated functionality of the presented components, UE1 100 comprises processor integrated circuit (IC) 102, which connects via a plurality of bus interconnects (illustrated by the bi-directional arrows) to a plurality of functional components of UE1 100. Processor IC 102 can include one or more programmable microprocessors, such as a data processor 104 and a digital signal processor (DSP) 106, which may both be integrated into a single processing device, in some embodiments. The processor IC 102 controls the communication, image capture, and other functions and/or operations of UE1 100. These functions and/or operations thus include, but are not limited to, application data processing and signal processing.

Connected to processor IC 102 is memory 108, which can include volatile memory and/or non-volatile memory. One or more executable applications can be stored within memory for execution by data processor 104 on processor IC 102. For example, memory 108 is illustrated as containing Secure Access Authentication (SAA) utility 110, which can include a QR code generation utility 112. The associated functionality and/or usage of each of the software modules will be described in greater detail within the descriptions which follow. In particular, the functionality associated with and/or provided by SAA utility 110 is described in greater details with the description of FIG. 2 and several of the flow charts and other figures. In one embodiment, and particularly where UE1 100 is utilized as the device that is being used to capture an image of a QR code from a second device, UE1 100 can also include QR reader 114 and/or camera control/interface 116. Also, in one or more embodiments, SAA utility 110 can be configured to access an externally located QR code generating facility 180. As illustrated, access to QR code generating facility 180 can be via wireless network 170, although alternate access modes can also be supported. QR code generating facility 180 can be a server that is accessible via the internet utilizing a specific universal resource locator (URL) programmed into SAA utility 110, in one embodiment.

Also shown coupled to processor IC 102 is storage 150 which can be any type of available storage device capable of storing one or more application software and data. It is further appreciated that in one or more alternate embodiments, the device storage can actually be remote storage and not an integral part of the device itself. As provided, storage 150 contains current authentication mechanism(s) 152, which includes authentication QR code 155. The specific usage and/or functionality associated with these components are described in greater detail in the following descriptions.

UE1 100 also comprises one or more input/output devices, including one or more input devices, such as camera 120, microphone 121, touch screen and/or touch pad 122, keypad 123, and/or one or more output devices, such as display 125, speaker 126, and others. UE1 100 can also include a subscriber information module (SIM) 127 which can provide unique identification of the subscriber that owns or utilizes the UE1 100, as well as specific contacts associated with the particular subscriber. In order to allow UE1 100 to provide time data, UE1 100 also includes system clock 128.

According to one aspect of the disclosure and as illustrated by FIG. 1, UE1 100 supports at least one and potentially many forms of wireless, over-the-air communication, which allows UE1 100 to transmit and receive communication with at least one second device. As a device supporting wireless communication, UE1 100 can be one of, and be referred to as, a system, device, subscriber unit, subscriber station, mobile station (MS), mobile, mobile device, remote station, remote terminal, user terminal, terminal, communication device, user agent, user device, cellular telephone, a satellite phone, a cordless telephone, a Session Initiation Protocol (SIP) phone, a wireless local loop (WLL) station, a personal digital assistant (PDA), a handheld device having wireless connection capability, a computing device, such as a laptop, tablet, smart phone, personal digital assistant, or other processing devices connected to a wireless modem. To support the wireless communication, UE1 100 includes one or more communication components, including transceiver 130 with connected antenna 132, wireless LAN module 134, Bluetooth® transceiver 137 and near field communication transceiver module 138. As further illustrated, UE1 100 can also include components for wired communication, such as modem 135 and Ethernet module 136. Collectively, these wireless and wired components provide a communication means or mechanism 165 by which UE1 100 can communicate with other devices and networks.

The wireless communication can be via a standard wireless network, which includes a network of base stations, illustrated by evolution Node B (eNodeB) 140 and associated base station antenna 142. A first over-the-air signal 144 is illustrated interconnecting base station antenna 142 with local antenna 132 of UE1 100. Additionally, communication with the at least one second device can be established via near field communication transceiver module 138. In at least one embodiment, UE1 100 can exchange communication with one or more second devices, of which UE2 146 and UE3 148 are illustrated. As described in further detail below, each of UE2 146 and UE3 148 can be second devices with which UE1 100 can establish a communication channel following the exchange of specific authentication and/or access credentials. The path of communication between UE1 100 and the second devices can be via near field communication, Bluetooth, or via wireless network 170, as indicated by the second over-the-air signal 172 between base station antenna 142 and UE2 146.

Figure 2:
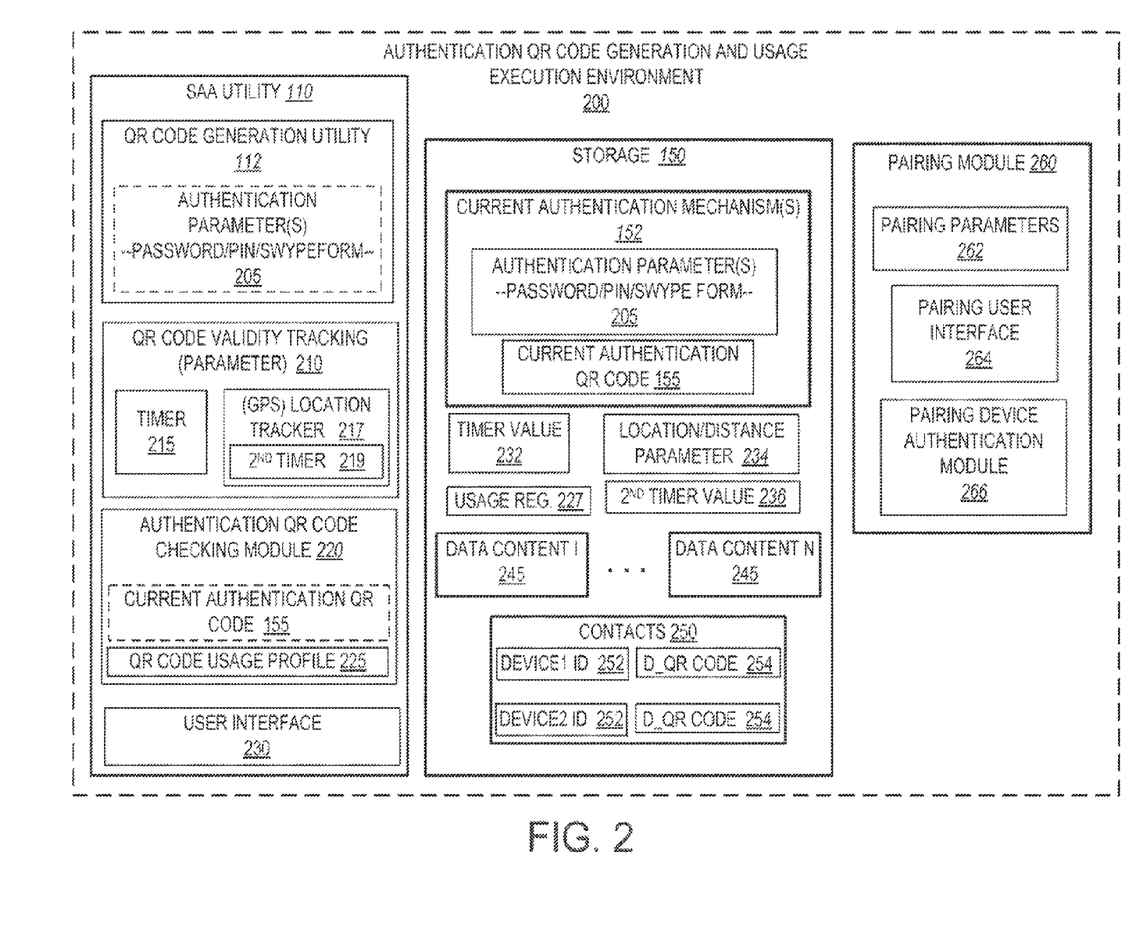
FIG. 2 illustrates an example authentication QR code generation environment with functional components thereof, according to one or more embodiments.

Turning now to FIG. 2, a more detailed diagram of an example Authentication QR Code Generation and Usage (QRGU) execution environment 200 is illustrated. QRGU execution environment 200 includes a combination of hardware, firmware, software and data components, which collectively perform the various aspects of the disclosure by execution of SAA utility 110 and other functional components on data processor 104 and/or embedded device controllers. As shown, QRGU execution environment 200 includes SAA utility 110, which comprises QR code generation utility 112, QR access authentication parameter validity tracking module 210, authentication QR code checking module 220, and user interface 230. QR code generation utility 112 receives one or more current device access authentication parameter(s) 205 as input, and generates a corresponding authentication QR code 155 representing the current authentication parameter(s) 205. In one or more implementations, the current device access authentication parameter(s) 205 include one or more of a password, a login-password combination, an alphanumeric pin, a swipe input sequence, or other form of authentication parameter. The current authentication parameter(s) 205 can be randomly generated or manually inputted by a user of UE1 100 within user interface 230. Importantly, the current authentication parameter(s) 205 have a limited lifespan and are periodically changed and/or updated. This aspect of the current authentication parameter(s) 205 is reflected in the QR code 155, which also constantly and/or periodically changes based on one or more triggers. The one or more triggers are monitored and enforced by QR access authentication parameter validity tracking module 210. As shown, QR access authentication parameter validity tracking module 210 can include a timer 215 as well as a location tracker 217, which in one embodiment can be a global positioning system (GPS) location tracker. The functional use of these two components is described in detail in a following section of the disclosure. In one implementation, location tracker 217 also has a second timer 219, which determines a time during which a QR code remains valid within a specific device location before a new QR code is required to be generated.

In one or more embodiments, QR code generation utility 112 comprises firmware, which packages and transmits the current authentication parameter(s) 205 to an external QR code generating facility 180 (FIG. 1), such as a website on a remote server. The QR code generating facility 180 then generates the corresponding QR code 155, and returns the QR code 155 to UE1 100. In these implementations, the transmission of the authentication parameters 205 and subsequent return transmission of the corresponding QR code 155 can occur via wireless network 170 or other communication medium.

Authentication QR code checking module 220 performs a comparison of a received QR code being provided as the authentication mechanism by a second device requesting access to link to UE1 100 via a pairing channel. Authentication QR code checking module 220 either checks the received QR code against the current authentication QR code 155 (e.g., via QR image matching) or deciphers the received QR code and checks the deciphered parameters against the current authentication parameter(s) 205.

In one or more embodiments, Authentication QR Code Generation and Usage (QRGU) execution environment 200 can include a QR code usage profile 225 as well as an associated usage register 227. In the illustrative embodiment, the QR code usage profile 225 is maintained within authentication QR code checking module 220, while usage register 227 is shown within storage 150. Regardless of their location relative to the other components, the functionality provided by these components can include limitations on the use of the generated QR codes and functional enhancements related to the implementation of the QR codes as the authentication mechanism for UE1 100. More detail about these two components is provided in the description of FIGS. 9 and 10.

QRGU execution environment 200 also comprises non-volatile storage 150, within which is maintained several types of data and information germane to execution of the various different utilities. Specifically, storage 150 includes current authentication mechanisms 152, which comprises both current authentication parameter(s) 205 and current authorization QR code 155. Also maintained in storage 150 are periodic timer value 232 and/or device location range parameter 234, both respectively utilized by periodic timer 215 and (GPS) location tracker 225. Second timer value 236 corresponding to second timer 227 can also be maintained within storage 150.

Also illustrated within storage 150 is data content 245, which can be divided into separate sets of data content, each having different requirements for security and/or being assigned different secure access parameters and/or being tagged for access by specific second devices. As further shown, storage 150 includes contacts 250, which is a database or list of known persons or second devices or subscribers with which UE1 100 can communicate. Each contact is represented by a separate row in contacts 250 and includes a contact ID and/or device ID 252. Additionally, each contact can have an associated access permission parameter, which is indicated as a device-specific QR code 254. Accordingly, one or more embodiments enable granular assignment of QR codes to specific second devices 252 for access to specific data content 245 on UE1 100.

QRGU execution environment 200 also includes pairing module 260, which controls the pairing functions of UE1 100 to one or more second devices. Pairing module 260 includes pairing parameters 262, a pairing user interface 264, and pairing device authentication module 266. Pairing device authentication module 266 checks the received authentication and pairing parameters received from a second device attempting to connect with UE1 100 to ensure the second device has the correct authorization to complete the pairing. In one embodiment, pairing device authentication module 266 triggers authentication QR code checking module 220 to perform the authentication checking when a QR code is provided as the received authentication parameter. In an alternate embodiment, pairing device authentication module 266 can also perform the QR code checking features of authentication QR code checking module 220.

The above described features of UE1 100 (FIG. 1) and QRGU execution environment 200 (FIG. 2) presents a first aspect of the disclosure, which provides an electronic device (UE1 100) comprising: a display 125; a communication mechanism 165; and a processor 104 that is communicatively coupled to the display 125 and the communication mechanism 165. The electronic device (100) further includes a secure access authentication (SAA) utility 110 that executes on the processor 104 and configures the device (100) to: generate a first authentication QR code 155; assign the first authentication QR code as an authentication mechanism for accessing a first device; and establish at least one QR code validity parameter that defines when access to the first device can be provided to at least one second device that provides the first authentication QR code along with an access request. The SAA utility 110 further configures the device (100) to, in response to a pre-defined trigger associated with the selected at least one QR code validity parameter: generate a new authentication QR code that is different from a previously generated authentication QR code 155; assign the new authentication QR code 155 as the current authentication mechanism for accessing the first device; associate a corresponding new QR code validity parameter to the new authentication QR code; and initiate a tracking of the corresponding new QR code validity parameter during which the new authentication QR code 155 remains valid.

In one or more embodiments, the at least one QR code validity parameter comprises at least one of (1) a time window having an end time and (2) a defined location within which a current authentication QR code remains valid, and outside of which the authentication QR code is invalid; and (3) a defined location within which a current authentication code remains valid until the end of a second time window (as measured by second timer 227). According to validity parameter (3), the authentication QR code becomes invalid when the first device remains in the same defined location for longer than the second time window. Thus, the pre-defined trigger is an associated one of the end time, movement of the first device outside of the defined location, and the first device remaining in the defined location for longer than a set period of time. Additionally, the pre-defined trigger can include at least one of: completion of a pre-defined amount of data transfer from the first device to a requesting device; completion of a transfer of a specific set of data from the first device to a requesting device; and movement of the requesting device out of a communication range from the first device.

The SAA utility 110 further configures the device (100) to: enable access to the first device by at least one second device (e.g., UE2 146) that communicates an access request to the first device (100), where the access request provides an authentication QR code that is the current authentication parameter for accessing the first device (100), while the selected at least one QR code validity parameter associated with the authentication QR code remains valid.

According to one embodiment, the SAA utility 110 further enables access to the first device (100) by enabling a pairing of a second device with the first device (100) in response to the second device providing the authentication QR code that is the current authentication parameter during pairing of the second device to the first device. In at least one implementation, the SAA utility configuring the device (100) to pair with a second device includes configuring the device (100) to perform at least one of: wireless communication between the first device and the second device; data transfer between the first device and the second device; an exchange of information between the first device and the second device; accessing one or more of files and data on the first device by the second device; and controlling of the first device via inputs provided on the second device.

In yet another embodiment, the SAA utility configuring the device to generate the first authentication QR code and periodically generate a new authentication QR code comprises the SAA utility further configuring the device to: periodically generate a new QR code validity parameter required to be entered before access is permitted to the first device; convert the new QR code validity parameter into a corresponding authentication QR code; discard the previous authentication QR code; and prevent access to the first device when a received access request includes the previous authentication QR code.

Figure 3:
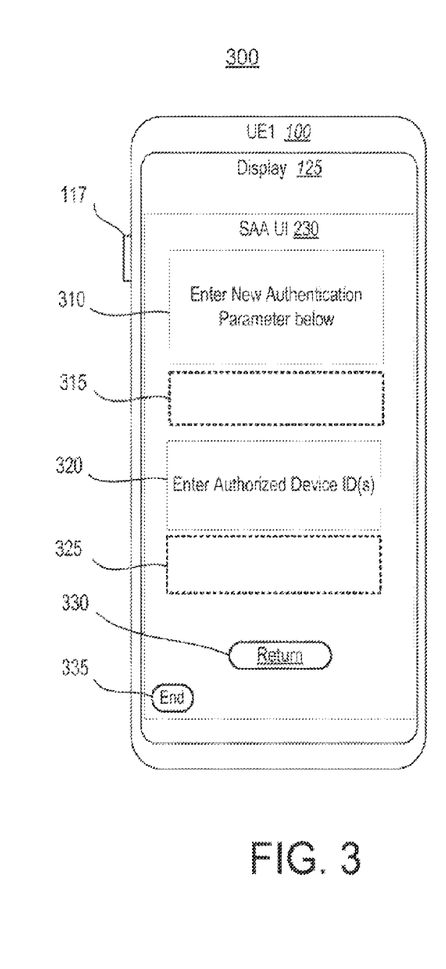
FIG. 3 is a block diagram illustration of user interface prompts that enable entry of authentication parameters on a first user equipment, in accordance with one embodiment.
Figure 4:
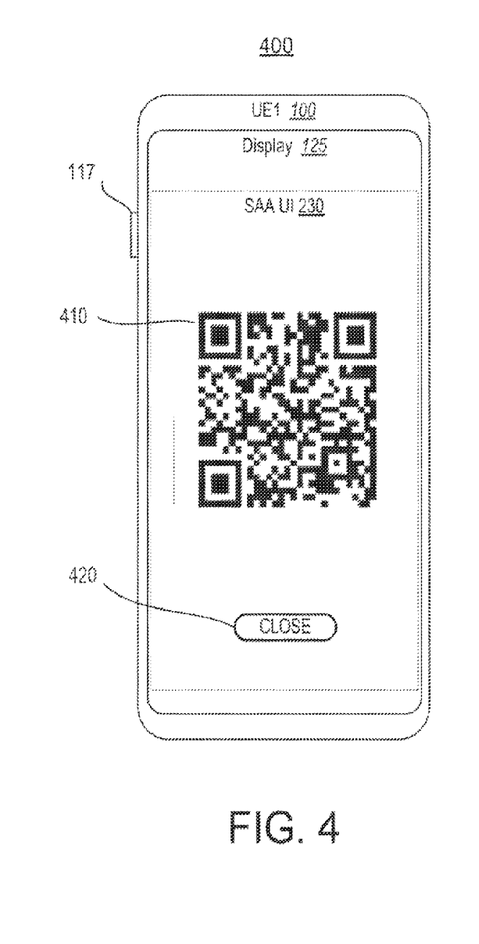
FIG. 4 is a block diagram illustration of the user interface of the first user equipment displaying an authentication QR code for communicating of the authentication QR code to a second device via image capture, in accordance with one embodiment.

Turning now to FIGS. 3-4, there are illustrated two different views of UE1 100 and specifically features presented within different user interfaces on display 125 of UE1 100. FIG. 3 presents user interface prompts that enable entry of authentication parameters on UE1 100, while FIG. 4 presents an example user interface displaying a current authentication QR code for communicating to a second device via image capture, in accordance with one embodiment. Within FIG. 3, UE1 100 is shown with display 125 presenting SAA UI 230. SAA UI 230 comprises two prompts and associated entry spaces. First prompt 310 is a request to enter a new authentication parameter. A user of UE1 100 can enter alphanumeric characters or values within first entry 315 as the authentication parameters. In one or more alternate embodiments, authentication parameters can be randomly generated by SAA utility 110 (FIG. 1). First entry 315 can then be utilized when specific user authentication parameters are to be assigned to certain identified second devices. Second prompt 320 presents a request to identify a specific second device ID, which the user wants associated with the authentication parameters entered at first entry 315. In one implementation, the user can enter multiple second devices or no second devices. When no entry is provided within second entry 325, the entered authentication parameters becomes the global authentication parameters required by any and all second devices. SAA UI 230 also provides a return soft button 330 and an end soft button 335 to allow the user to return the entries for processing by SAA utility or to exit the SAA UI 230, respectively.

Figure 5:
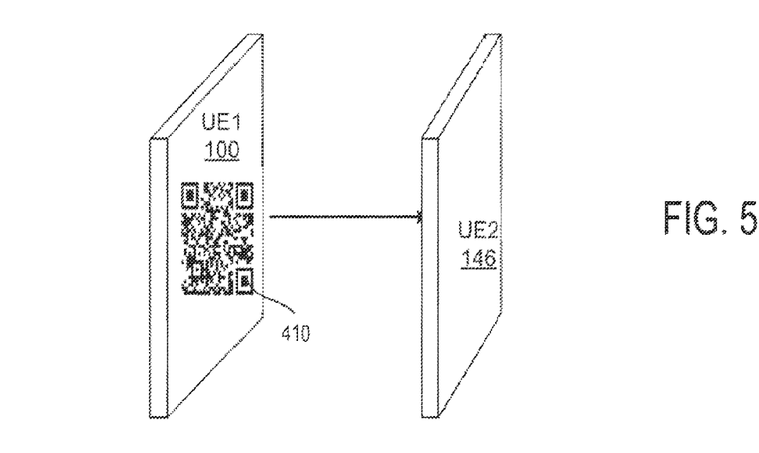
FIG. 5 illustrates an example implementation scenario in which an image of a generated authentication QR code is communicated to a second device, in accordance with one embodiment.

Within FIG. 4, SAA UI 230 presents the QR code image 410 that corresponds to the authentication parameters provided within first entry 315 (FIG. 3). When the QR code is being displayed within SAA UI 230, UE1 100 supports transfer of authentication QR code image 410 via image capture by a second device. FIG. 5 illustrates an example implementation scenario in which an image of a generated authentication QR code image 410 is communicated to a second device, UE2 146, in accordance with one embodiment. As shown, in order for direct image transfer, both devices 100, 146 have to be placed face to face within a maximum distance from each other. These two requirements ensure that only a second device that is known to the user of UE1 100 will likely be in a position to capture the displayed QR code image 410 and later utilize the QR code image 410 as the authentication parameter to access data content on UE1 100.

According to one embodiment, the SAA utility 110 configures the device (100) to communicate the authentication QR code to at least one second device by displaying the generated authentication QR code on a display of the first device to allow a camera of the at least one second device that is placed in proximity to the first device to capture an image of the QR code. In one or more embodiments, authorization to access the first device is limited to only second devices that are allowed to be placed in a position adjacent the display, within a proximate distance to the display at which an image of the authentication QR code can be captured.

In one alternate embodiment, the SAA utility 110 configures the device to communicate the authentication QR code to at least one second device by transmitting the authentication QR code via a text message to a second device. In yet another embodiment, the SAA utility configures the device to: communicate the authentication QR code to at least one second device by transmitting the authentication QR code via one of an electronic and a wireless communication medium to a second device.

Figure 6:
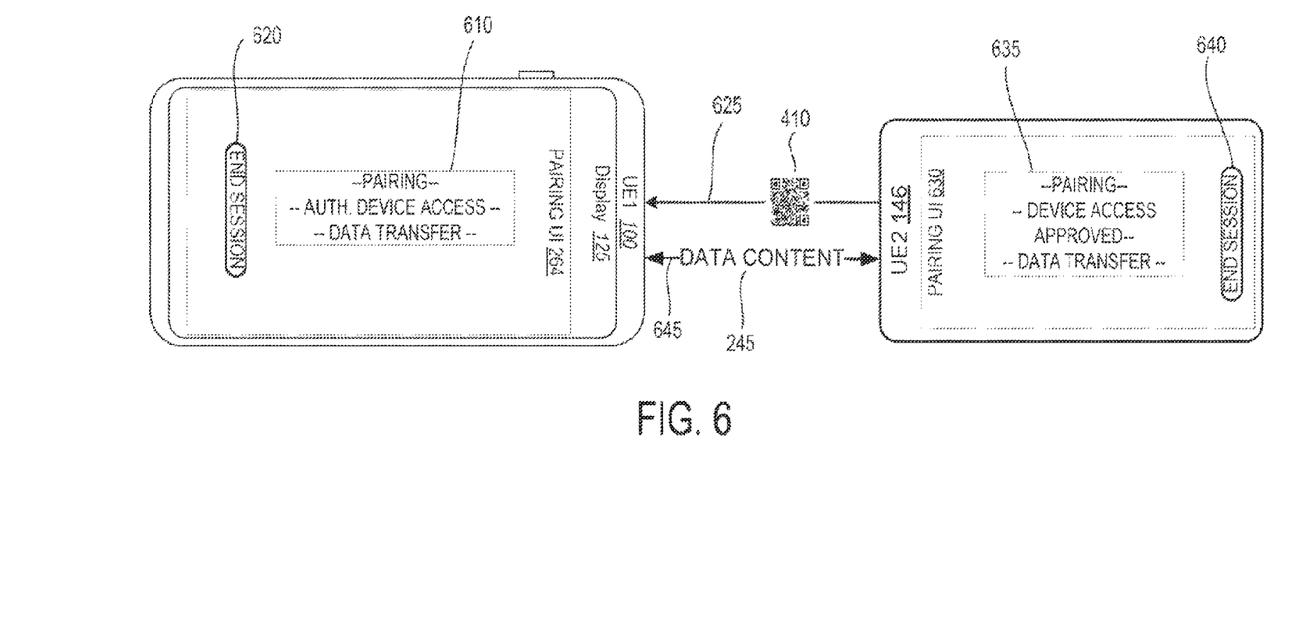
FIG. 6 illustrates an example implementation scenario when a second device is paired with a first device and authenticated using the generated and shared authentication QR code, in accordance with one embodiment.

FIG. 6 illustrates an example implementation scenario in which a second device, UE2 146, is paired with UE1 100, where the second device is authenticated using the generated and shared authentication QR code 410, in accordance with one embodiment. As shown, both devices are oriented in one of several alternate pairing configurations. UE1 100 includes pairing UI 264 presented on display 125. Pairing UI 264 can present certain aspects of the pairing functions occurring on UE1 100 within a status output area 610, including three different status reports, namely, pairing, device access authentication, and data transfer. UE2 146 also includes second pairing UI 630, which presents three second device status reports within second status output area 635, namely pairing, device access approved, and data transfer. Both pairing UIs 264 and 630 include an end session soft button 620, 640, by which each device can terminate an ongoing pairing session. The connecting lines between the devices indicate two communication paths during the pairing process. First connecting line 625 indicates a transfer of a copy of QR code 155 from UE2 146 to UE1 100 as the authentication mechanism during initial pairing. Once authentication is completed, a communication channel, represented as bi-directional arrow 645, is opened between the two devices and on which data content 245 can be transmitted from UE1 100 to UE2 146. Communication channel 645 actually enables two-way transfer between paired devices, in one or more embodiments.

To facilitate the use of authentication QR code 155 as the authentication mechanism for accessing data content on UE1 100, UE2 146 first captures and stores a copy of authentication QR code 155 from UE1 100. According to a least one embodiment, the SAA utility 110 further configures the device (100) to, in response to receiving a request for access to the first device from a second device: identify whether the request for access includes a received QR code; compare the received QR code with a currently assigned authentication QR code; and enable the second device to access the first device only in response to the received QR code matching the currently assigned authentication QR code.

Figure 7:
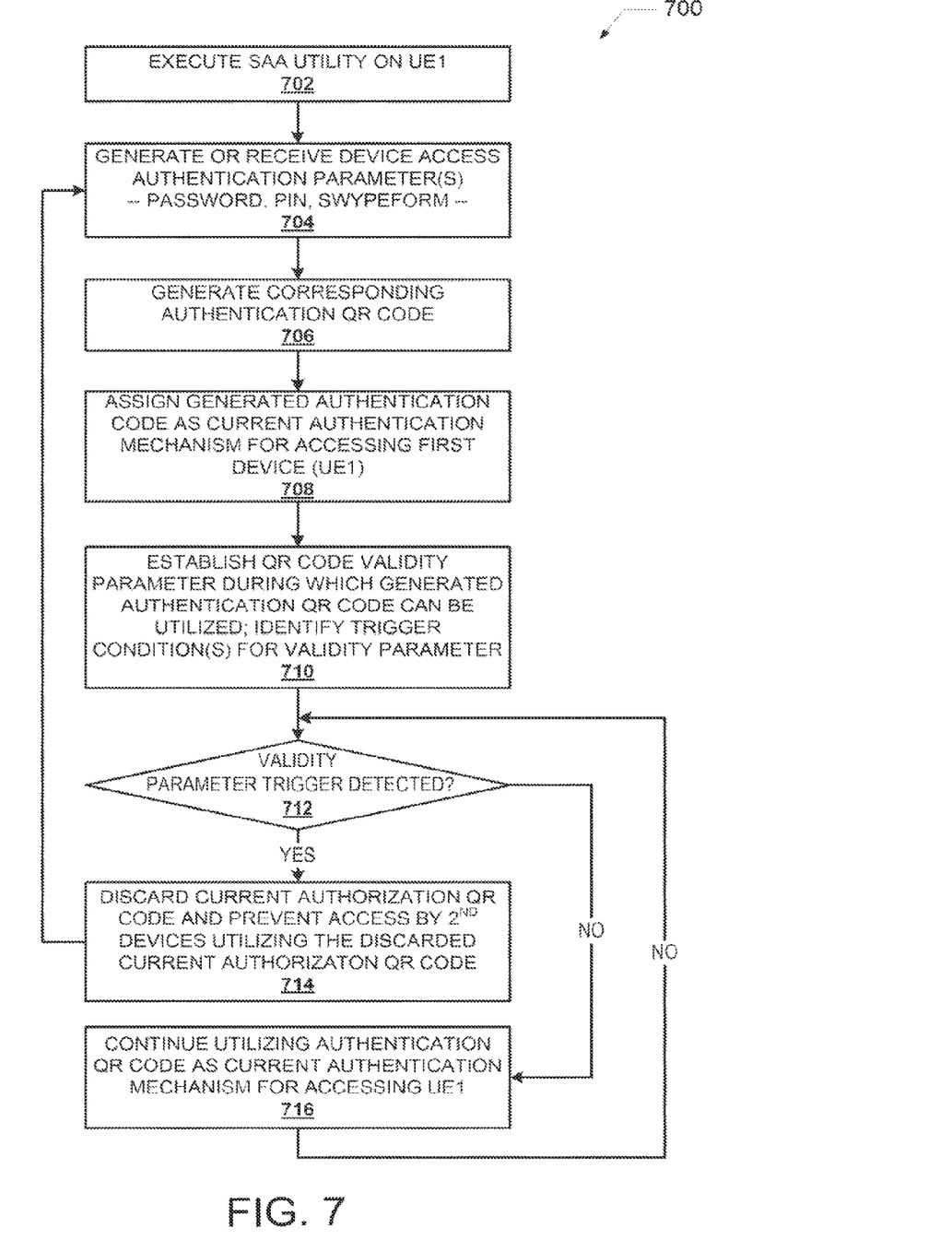
FIG. 7 is a flow chart illustrating aspects of a method by which a periodically changing authentication QR code is periodically generated and tracked for usage within a preset time limit, according to one or more embodiments.
Figure 8:
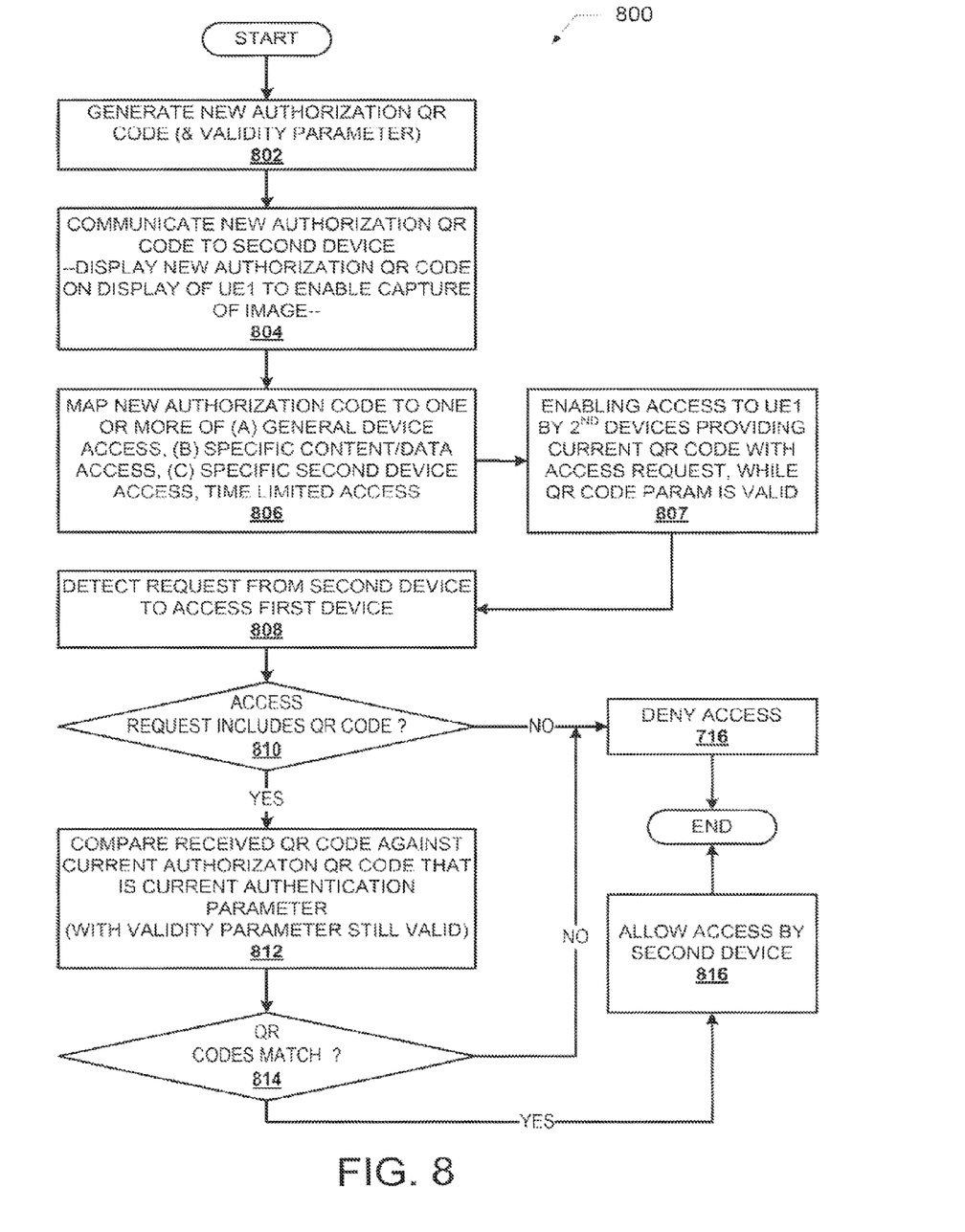
FIG. 8 is a flow chart illustrating aspects of a method by which the periodically changing authentication QR code is utilized as an authentication mechanism to enable secure access to a user equipment, according to one or more embodiments.
Figure 9:
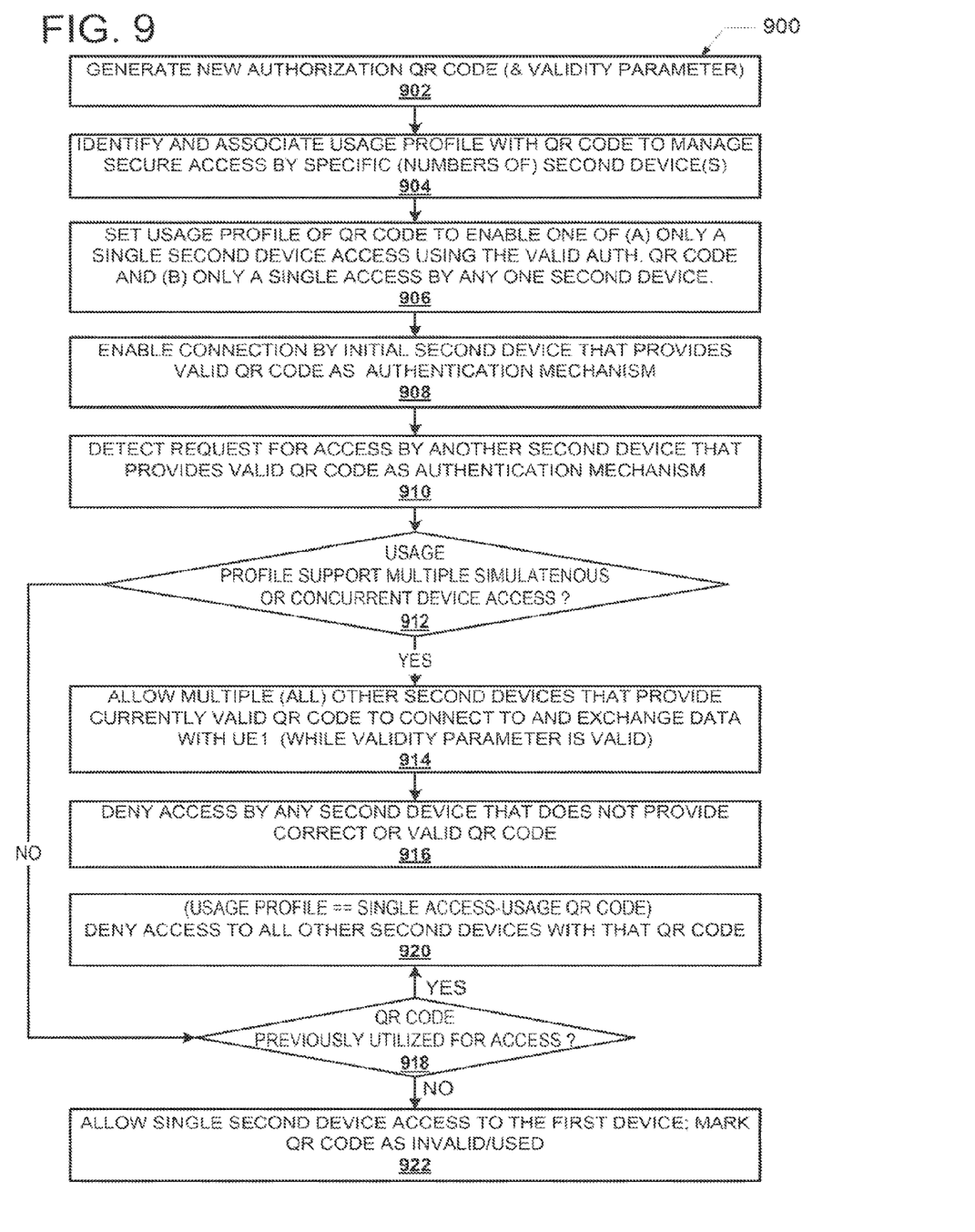
FIG. 9 is a flow chart illustrating aspects of a method by which a periodically changing authentication QR code is utilized by one or more second devices to access a first device based on a pre-established usage policy, according to one or more embodiments.
Figure 10:
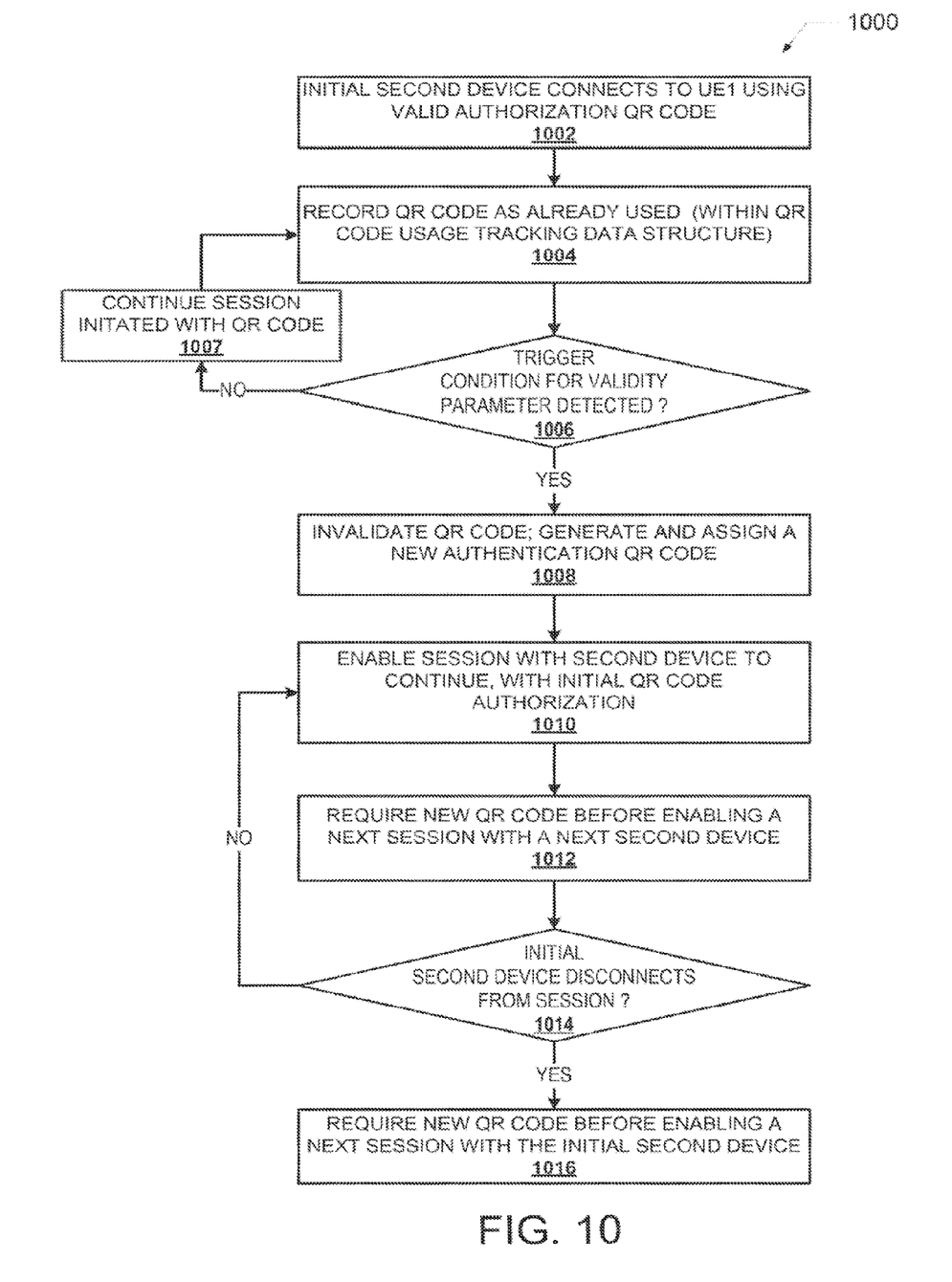
FIG. 10 is a flow chart illustrating aspects of a method by which the periodically-changing authentication QR code is utilized to enable concurrent access by multiple second devices, with a first access using a previously-generated QR code and a second, subsequent access requiring newly generated QR code, according to one or more embodiments.

With reference now to the flow charts, FIG. 7 is a flow chart illustrating aspects of a method 700 by which a periodically changing authentication QR code is periodically generated and tracked for usage within a preset time limit, according to one or more embodiments. FIG. 8 is a flow chart illustrating aspects of a method 800 by which the periodically changing authentication QR code is utilized as an authentication mechanism to enable secure access to an user equipment, according to one or more embodiments. FIG. 9 is a flow chart illustrating aspects of a method by which a periodically changing authentication QR code is utilized by one or more second devices to access a first device based on a pre-established usage policy, according to one or more embodiments. Finally, FIG. 10 is a flow chart illustrating aspects of a method by which the periodically changing authentication QR code enables overlapping access by one or more second devices to the first device while the QR code is changed for other second devices not currently accessing the first device, according to one or more embodiments.

With the descriptions that follow, certain aspects of the various methods can be implemented by processor 104 executing code from one or more of SAA utility 110 and/or pairing module 260 and/or other software or firmware components of UE1 100. Generally, the methods 700, 800, 900, and/or 1000 can be described as being performed by one or more of UE1 100, processor 104 or a specific utility, e.g., SAA utility 110, without limitation.

FIG. 7 presents a method 700 for providing security via Quick Response (QR) codes. The method 700 begins at block 702 at which processor 104 executes SAA utility 110 on UE1 100. Processor 104 then generates or receives an entry (e.g., via SAA UI 230) of one or more authentication parameter(s) 205 (block 704). With the received or generated authentication parameter(s) 205, processor 104 generates a corresponding authentication QR code 155 (block 706), and assigns the authenticated QR code 155 as the authentication mechanism for pairing with and/or accessing UE1 100 from a second device (block 708). At block 710, processor 104 establishes a QR code validity parameter 210. The QR code validity parameter 210 defines when access to the first device can be provided to at least one second device that provides the current authentication QR code along with an access request. As provided herein, QR code validity parameter 210 can be one or both of a time limit or a defined location within which the authentication QR code remains valid and outside of which the authentication QR code becomes stale or invalid and is automatically replaced with a new QR code. In one or more embodiments, the at least one QR code validity parameter comprises at least one of (1) a time window having an end time; (2) a defined location within which an authentication QR code remains valid, and outside of which the authentication QR code is invalid, wherein a new authentication QR code is automatically generated when the first device moves outside of the defined location and a new defined location is established for the new authentication QR code; and (3) a defined location within which a current authentication code remains valid until the end of a second time window, where a new authentication QR code is generated when the second time window ends and a new defined location and time window is established for the new authentication QR code.

Thus, at decision block 712, processor 104 determines whether a pre-defined trigger associated with the QR code validity parameter 210 is registered or detected. In one embodiment, this determination can generally be represented by a tracking value that indicates when the current authentication QR code 155 is still valid. In one embodiment, the pre-defined trigger is an associated one of the end time, movement of the first device outside of the defined location; and no movement outside of the defined location within a defined period of time. In one or more embodiments, the pre-defined trigger may include at least one of: passage of a preset amount of time following generation of a previously generated authentication QR code; completion of a pre-defined amount of data transfer from the first device to a requesting device; completion of a transfer of a specific set of data from the first device to a requesting device; and movement of the requesting device out of a communication range from the first device.

While the QR code validity parameter 210 indicates the current authentication QR code is still valid, method 700 includes processor 104 continuing to utilize the authentication QR code as the current authentication mechanism for accessing UE1 100, unless one of a first periodic timer or a second location timer expires (block 716). In one embodiment, a second periodic timer is utilized to automatically update the authentication QR code after passage of a certain amount of time and/or after the device has not moved from a general location following a pre-set amount of time. This embodiment can be utilized primarily when the QR code validity parameter 210 is a location based parameter and UE1 100 is not moved out of an initial location in which the first assigned authentication QR code would remain valid.

Returning to the flow chart, when the authentication QR code is no longer valid, e.g., in response to occurrence or detection of a pre-defined trigger associated with the selected QR code validity parameter 210, method 700 further includes processor 104 discarding the current (or previous) authentication QR code and preventing any future access to UE1 100 where the received access request includes and/or utilizes the discarded or stale QR code as the access mechanism (block 714). Method 700 also includes processor 104 returning to block 704 and, after receiving or generating new authentication parameters, generating a new authentication QR code that is different from a previously generated authentication QR code. As with the previously generated authentication QR code, the generation of a new authentication QR code includes processor 104 also: assigning the new authentication QR code as the current authentication mechanism for accessing the first device; associating a corresponding new QR code validity parameter 210 to the new authentication QR code; and initiating a tracking of the corresponding new QR code validity parameter 210 during which the new authentication QR code remains valid (blocks 708-712).

Thus, according to the above described embodiments, generating the first authentication QR code and periodically generating a new authentication QR code comprises the processor 104: periodically generating a new QR code validity parameter required to be entered before access is permitted to the first device; and converting the new QR code validity parameter into a corresponding authentication QR code.

Turning now to FIG. 8, method 800 begins at start block and proceeds to block 802 at which processor 104 generates a new authorization QR code 155 and associates the new authorization QR code with a corresponding new QR code validity parameter 210. At block 804, UE1 100 communicates the authentication QR code to at least one second device by displaying the generated authentication QR code on a display of UE1 100 to allow a camera or a QR reader of the at least one second device that is placed in proximity to the first device to capture an image of the QR code. With this embodiment, authorization to access the first device can then be limited to only second devices that are allowed to be placed in a position adjacent the display, within a proximate distance to the display at which an image of the authentication QR code can be captured. In one or more alternate embodiments, method 800 can involve UE1 100 communicating the authentication QR code to at least one second device by transmitting the authentication QR code via a text message to a second device. In yet other embodiments, method 800 can involve UE1 100 communicating the authentication QR code to at least one second device by transmitting the authentication QR code via one of an electronic and a wireless communication medium to a second device.

At block 806, method 800 includes processor 104 mapping or linking the new authentication QR code to one or more of (a) a general device access, (b) access to specific content on UE1 100, and/or access by one or more selected, specific second devices. One or more of the different accesses can include a time limit for such access. Method 800 further includes processor 104 enabling access to the UE1 100 by at least one second device that communicates an access request to the first device, where the access request provides an authentication QR code that is the current authentication parameter for accessing the first device, while the selected at least one QR code validity parameter associated with the authentication QR code remains valid (block 807).

Continuing with the illustrative embodiment, but not shown in FIG. 8, the enabling access comprises enabling pairing of a second device with UE1 100 in response to the second device providing the first authentication QR code as the authentication parameter during pairing of the second device to the first device. In one or more embodiments, pairing of the devices comprises at least one of: enabling wireless communication between the first device and the second device; enabling at least one data transfer between the first device and the second device; enabling an exchange of information between the first device and the second device; enabling access to one or more of files and data on the first device by the second device; and enabling control of the first device via inputs provided on the second device.

The actual method processes involved in the above described accesses by a second device to UE1 100 are presented in blocks 808-818. At block 808, method 800 includes processor 104 detecting a request from the second device to access UE1 100. In response to receiving the request for access to UE1 100 from a second device, method 800 includes processor 104 performing the following sequence of functions: identifying, as indicated by decision block 810, whether the request for access includes a received QR code; comparing the received QR code with a currently assigned authentication QR code (block 812); determining at block 814 if the received QR code matches the current authentication QR code, which is still valid; and enabling the second device to access the first device only in response to the received QR code matching the currently assigned authentication QR code (block 816). If at decision block 810, the request from the second device does not include a QR code, the processor 104 denies access to UE1 100 (block 818). Similarly, if received QR code does not match the current, valid, authentication QR code, the processor 104 denies access to UE1 100 (block 818). Method 800 then ends.

FIG. 9 provides a flow chart of a method for providing secure access to a first device via Quick Response (QR) codes with one or more usage profiles. Method 900 begins at block 902 at which processor 104 of UE1 100 generates a new authentication QR code, with associated validity parameter(s). The authentication QR code is then assigned as a current authentication mechanism for accessing UE1 100. At block 904, method 900 includes identifying and associating a usage profile 225 (FIG. 2) for the authentication QR code. According to one or more embodiments, the usage profile 225 can include permitting secure access by a specified number of second devices using the authentication QR code and/or permitting secure access under pre-established access criteria supporting the secure access. For example, in one embodiment, the usage profile is set to enable any second device to access the first device once the second device provides the valid authentication QR code during the access request. The usage profile can also be set to prevent any access to the first device that does not include the valid authentication QR code. At block 906, method 900 includes processor 104 setting the usage profile of the authentication QR to enable at least one of (a) only a single second device to access the first device using the valid authentication QR code and (b) only a single access using the valid authentication QR code by any one second device. Method 900 then includes enabling connection to the first device by an initial second device that provides a valid authentication QR code during an access request (block 908). At block 910, method includes UE1 100 detecting a request for access to UE1 100 by another second device (separate from the already connected initial second device), wherein the other second device also provides the valid authentication QR code as the access mechanism. At decision block 912, method 900 involves a determination of whether the usage profile includes supporting multiple simultaneous or concurrent second device accesses to UE1 100.

When decision block 912 yields an affirmative response, and the usage profile allows for concurrent access by multiple second devices, multiple other second devices that provide the valid authentication QR code are permitted to connect to and exchange data with UE1 100 (block 914). However, access to UE1 100 is denied for all other second devices that do not provide the valid authentication QR code (block 916).

However, at decision block 912, in response to the usage profile being set to a single access usage for the generated authentication QR code, method 900 includes determining at decision block 918 whether the QR code has been previously utilized to access UE1 100. In response to the QR code having already been utilized to access UE1 100, method 900 includes denying access to the first device by any other second device that utilizes the authentication QR code (as the access mechanism) or which does not provide a currently valid authentication QR code during the access request (block 920). However, when the QR code has not been previously utilized and is a current valid QR code, method 900 includes enabling the access by the initial second device to the first device (block 922). Thus, with this embodiment, access to UE1 100 is permitted only if the valid authentication QR code has not been previously utilized to provide access by another second device. Also, in response to the valid authentication QR code having been previously utilized to provide access by another second device, method 900 includes denying access to any subsequent second device, including second devices that provide the previously valid authentication QR code (block 920).

Turning now to FIG. 10, there is illustrated another flow chart showing the method 1000 by which an ongoing session is maintained between two connected devices. Method 1000 begins at block 1002 at which an initial second device connects to UE1 100 using the valid authorization QR code. At block 1004, the QR code is recorded within a QR code usage register 227 as being a used QR code. In one embodiment, the usage register 227 is a single register or bit associated with the QR code, and can be set to a logic high or low to indicate that the QR code has already been used to access UE1 100. In one embodiment, the register 227 can include multiple entries, one for each of a plurality of QR codes, with each QR code being tracked such that a first usage is recorded in the register 227 in an entry corresponding to that QR code. Alternate embodiments can allow for a fixed number of uses (greater than a single use) for one or more QR codes, as defined by the usage policy 225 associated with the QR code. A determination is made at block 1006 whether a trigger condition associated with the validity parameter has been encountered or detected. If the trigger condition is not encountered, then the devices continue the session using the existing QR code (block 1007). However, in response to detection of the trigger condition, the current QR code is made invalid, and the method 1000 includes generating a new authentication QR code and assigning the new QR code as the authentication mechanism (block 1008). As shown at block 1010, the method 1000 also includes enabling the ongoing session established prior to the generating of the new authentication QR code to continue while the session remains connected. Notably, this ongoing session still maintains the previous authentication QR code, which has been made invalid by the trigger condition. However, as provided at block 1012, method 1000 further comprises requiring the new authentication QR code before enabling a next session with any other second device, even while the first session initiated with the previously valid QR code is ongoing. At decision block 1014, a determination is made whether the disconnection of the session with the initial second device is detected. In response to disconnection of the session, a subsequent access request by the initial second device requires the new QR code before the initial second device will be able to initiate the next session. Thus, method 1000 includes preventing the second device involved in the session from reconnecting to the first device without the second device providing the new authentication QR code with an access request to reconnect the session (block 1016). However, as previously noted, the initial second device is permitted to continue with the session using the previously valid QR code so long as the session remains open and is not terminated.

In each of the flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:
1. A method, comprising:
at a first electronic device having one or more processors and memory storing one or more programs to be executed by the one or more processors:
providing to a remote service a first authentication code and information identifying a second electronic device that is associated with the first authentication code;
receiving a second authentication code from the remote service, wherein the second authentication code is based on the first authentication code and the information identifying the second electronic device, wherein the second authentication code is configured to be utilized by the second electronic device to access the first electronic device and establish one or more communication channels by which data content is transferred between the first electronic device and the second electronic device; and
after receiving the second authentication code from the remote service, transmitting the second authentication code from the first electronic device to the second electronic device to enable the second electronic device to access the first electronic device.
2. The method of claim 1, comprising receiving at the first electronic device an input comprising a password as the first authentication code.
3. The method of claim 1, wherein:
receiving the second authentication code comprises receiving a pairing code corresponding to the first authentication code; and in accordance with the paring code, enabling paring with the second electronic device and an access to the first electronic device by the second electronic device.

4. The method of claim 3, wherein receiving the pairing code corresponding to the first authentication code comprises receiving a quick response (QR) code.

5. The method of claim 1, wherein transmitting the second authentication code from the first electronic device to the second electronic device comprises transmitting an authentication code configured to be valid for accessing the first electronic device by the second electronic device within a period of time.

6. The method of claim 1, wherein transmitting the second authentication code from the first electronic device to the second electronic device comprises transmitting an authentication code configured to be valid for accessing the first electronic device by the second electronic device within a defined location and configured to be invalid outside of the defined location.

7. The method of claim 1, wherein transmitting the second authentication code from the first electronic device to the second electronic device comprises transmitting an authentication code associated with a usage profile, wherein the usage profile defines at least a specified number of devices permitted to access the first electronic device and one or more pre-established access criteria supporting secure access by the specified number of second devices, and the specified number of devices includes the second electronic device.

8. The method of claim 1, wherein transmitting the second authentication code from the first electronic device to the second electronic device comprises transmitting an authentication code configured to be invalid following a data transfer of the data content from the first electronic device to the second electronic device.

9. The method of claim 1, comprising:
receiving from the remote service a third authentication code when the second authentication code is invalid; and
transmitting the third authentication code from the first electronic device to the second electronic device.

10. An electronic device, comprising:
a processor and memory storing one or more programs for execution by the processor to cause the processor:
provide to a remote service a first authentication code and information identifying a second electronic device that is associated with the first authentication code;
receive a second authentication code only at the electronic device from the remote service, wherein the second authentication code is based on the first authentication code and the information identifying the second electronic device, wherein the second authentication code is configured to be utilized by the second electronic device to access the electronic device and establish one or more communication channels by which data content is transferred between the electronic device and the second electronic device; and
after receiving the second authentication code from the remote service, transmit the second authentication code from the electronic device to the second electronic device to enable the second electronic device to access the electronic device.

11. The electronic device of claim 10, wherein the first authentication code comprises a user password, and wherein the second authentication code comprises a unique pairing code generated based on the password.

12. The electronic device of claim 10, wherein the second authentication code is configured to be valid for accessing the electronic device by the second electronic device within a predetermined period of time.

13. The electronic device of claim 10, wherein the second authentication code is configured to be valid for accessing the electronic device by the second electronic device within a defined area and configured to be invalid beyond the defined area.

14. The electronic device of claim 10, wherein the processor is configured to receive a third authentication code when the second authentication code is determined to be invalid.

15. The electronic device of claim 14, wherein the processor is configured to transmit the third authentication code from the electronic device to the second electronic device, wherein the third authentication code is configured to be utilized to establish the one or more communication channels by which the data content is transferred between the electronic device and the second electronic device.

16. The electronic device of claim 10, wherein the second authentication code is associated with a user profile.

17. The electronic device of claim 16, wherein the processor is configured to allow a pairing between the electronic device and the second electronic device, and to prevent a pairing between the electronic device and a third electronic device that is not in the user profile based on the user profile.

18. The electronic device of claim 10, wherein the processor is configured to transmit the data content from the electronic device to the second electronic device based on the second authentication code.

19. A non-transitory computer-readable medium having computer executable code stored thereon, the code comprising instructions to:
cause a processor of a first electronic device to provide to a remote service a first authentication code and information identifying a second electronic device that is associated with the first authentication code;
cause the processor to receive a second authentication code from the remote service, wherein the second authentication code is based on the first authentication code and the information identifying the second electronic device, wherein the second authentication code is configured to be utilized by the second electronic device to access the electronic device and establish one or more communication channels by which data content is transferred between the first electronic device and the second electronic device; and
cause the processor to after receiving the second authentication code from the remote service, transmit the second authentication code from the electronic device to the second electronic device to enable the second electronic device to access the electronic device.

20. The non-transitory computer-readable medium of claim 19, wherein the code comprises instructions to cause the processor to utilize the second authentication code to transmit the data content from the first electronic device to the second electronic device until one or more validity conditions associated with the second authentication code are violated.

* * * * *

UNITED STATES PATENT AND TRADEMARK OFFICE
CERTIFICATE OF CORRECTION

PATENT NO. : 9,794,253 B2
APPLICATION NO. : 14/712034
DATED : October 17, 2017
INVENTOR(S) : Narayan et al.

Page 1 of 1

It is certified that error appears in the above-identified patent and that said Letters Patent is hereby corrected as shown below:

In the Claims

Claim 3, Column 17, Line 1, please delete "paring code, enabling paring" and insert --pairing code, enabling pairing--;

Claim 10, Column 17, Line 44, please delete "processor:" and insert --processor to:--;

Claim 19, Column 18, Line 48, please delete "the electronic" and insert --the first electronic--;

Claim 19, Column 18, Line 54, please delete "the electronic" and insert --the first electronic--;

Claim 19, Column 18, Line 56, please delete "the electronic" and insert --the first electronic--.

Signed and Sealed this
Second Day of January, 2018

Joseph Matal
*Performing the Functions and Duties of the*
*Under Secretary of Commerce for Intellectual Property and*
*Director of the United States Patent and Trademark Office*